US007500818B1

(12) United States Patent
Johnson

(10) Patent No.: US 7,500,818 B1
(45) Date of Patent: Mar. 10, 2009

(54) PASSENGER LIFT WITH PASSENGER SENSITIVE MOVEABLE BARRIER

(75) Inventor: David Johnson, Modesto, CA (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 601 days.

(21) Appl. No.: 11/005,867

(22) Filed: Dec. 6, 2004

Related U.S. Application Data

(60) Provisional application No. 60/527,134, filed on Dec. 4, 2003.

(51) Int. Cl.
*B60P 3/00* (2006.01)

(52) U.S. Cl. ....................... 414/556; 414/546; 414/921; 60/399

(58) Field of Classification Search ................. 414/546, 414/556, 921; 60/399
See application file for complete search history.

(56) References Cited

U.S. PATENT DOCUMENTS 6,095,747 A 8/2000 Cohn
6,203,266 B1 * 3/2001 Savaria et al. ............... 414/546
6,305,897 B1 * 10/2001 Budd et al. ................. 414/540
6,558,106 B2 * 5/2003 Sardonico ................... 414/556
6,692,217 B1 * 2/2004 Pierrou ....................... 414/539

OTHER PUBLICATIONS

National Highway Traffic Safety Administration, *Federal Motor Vehicle Safety Standards*, 49 C.F.R. Parts 571.403 and 571.404, Dec. 27, 2004.

* cited by examiner

*Primary Examiner*—Michael S Lowe
(74) *Attorney, Agent, or Firm*—Christensen O'Connor Johnson Kindness PLLC

(57) ABSTRACT

A wheelchair lift (100) for a vehicle having a barrier (128) moveable between an access position and a blocking position. The wheelchair lift includes an actuator (152) coupled to the barrier, the actuator adapted to apply an actuation force upon the barrier to move the barrier from the access position to the blocking position. When the barrier is in an unloaded state, the actuation force causes the actuator to move in a first direction resulting in the barrier moving from the access position to the blocking position. When the barrier is in a loaded state, the actuation force causes the actuator to move in a second direction a predetermined amount without causing substantial movement of the barrier.

29 Claims, 11 Drawing Sheets

PASSENGER LIFT WITH PASSENGER SENSITIVE MOVEABLE BARRIER

CROSS-REFERENCE TO RELATED APPLICATION

This application claims the benefit of U.S. Provisional Patent Application No. 60/527,134, filed on Dec. 4, 2003, entitled Wheelchair Lift With Passenger Sensitive Moveable Barrier, the disclosure of which is hereby expressly incorporated by reference.

FIELD OF THE INVENTION

The described embodiments relate generally to vehicle wheelchair lifts, and more specifically to wheelchair lifts having pressure sensitive moveable barriers.

BACKGROUND OF THE INVENTION

Recently, the Federal Motor Vehicle Safety Standards (FMVSS) adopted a new rule establishing two new Safety Standards, 49 C.F.R. Parts 571.403 and 571.404, relative to vehicles equipped with wheelchair lifts.[1] The National Highway Traffic Safety Administration (NHTSA) authored the new Standards, which become effective Dec. 27, 2004. Although the new Safety Standards specify numerous requirements that lift manufacturers and vehicle manufacturers must comply with, the specific mandate to restrict movement of certain lift operating devices when occupied by a passenger or mobility aid, presented a new challenge to lift manufacturers.

[1] The first safety standard, promulgated in FMVSS No. 403, entitled Platform Lift Systems for Motor Vehicles, establishes minimum performance standards for platform lifts designed for installation on a motor vehicle. The second safety standard, promulgated in, FMVSS No. 404, entitled Platform Lift Installations in Motor Vehicles, places specific requirements on vehicle manufacturers or alterers who install the lifts on new vehicles. Under this final rule, lift manufacturers will have to certify that their lifts meet the requirements of FMVSS No. 403, and manufacturers or alterers of new vehicles will have to ensure that the lifts are installed according to the lift manufacturer's instructions by certifying compliance with FMVSS No. 404. Federal Register/Vol. 67, No. 249/ Dec. 27, 2002/Rules and Regulations/Page 79416.

The new FMVSS requirements relative to "passenger detection" are paraphrased below. For the complete text, refer to FMVSS No. 403, including the referenced tests required to verify compliance with the Safety Standard.

1. An interlock is required to prevent operation of the outboard barrier from the extended ramp position to the upright barrier position while at the ground or sidewalk level loading position if the outboard barrier is occupied by a passenger or mobility aid. See reference FMVSS No. 403, S6.10.2.6.

2. An interlock is required to prevent operation of the inboard roll stop from the extended bridge position to the upright roll stop position while at the vehicle floor level loading position if the inboard roll stop is occupied by a passenger or mobility aid. See Reference FMVSS No. 403, S6.10.2.7.

Existing sensor technologies, such as switch-mats, ultrasonic sensors, or infrared sensors, used to detect a passenger on the lift platform in order to prevent an occupied lift from stowing, are not well suited for the purposes specified in the new Safety Standard due to the physical design constraints of the lift's outer barrier and inner roll stop.

The problems associated with using switch-mat technology to comply with the new Safety Standards include at least the following:

1. With respect to the outer barrier and inner roll stop:

a. The outer barrier functions as a ramp and the inner roll stop functions as a bridge for lift platform ingress and egress at the ground level loading position and the vehicle floor level loading position, respectively. Existing standards, as well as the new Safety Standards, specify requirements limiting vertical surface transitions. Switch-mats range in thickness from 0.31 to 0.50 inches. Consequently, the use of switch-mats will exceed the operating profile of these devices.

b. Switch-mats are heavy. Adding the weight of a switch-mat to the outer barrier or inner roll stop will increase the power transmission requirements to operate the devices increasing the weight and cost of the wheel chair lift.

The problems associated with using ultrasonic or infrared technology to comply with the new Safety Standards are:

1. The sensing pattern must be precise to avoid erroneous detection. Installation logistics, affecting sensing range and directional control compromise the accuracy demanded for this application of the sensor.

2. The sensor must be kept clean for reliable operation. The transit environment is dirty. Regular preventive maintenance is required to keep the sensor(s) lens clean for proper functionality.

3. Physical size precludes use on the outer barrier and inner roll stop.

In view of the foregoing, there exists a need for a wheel chair lift having moveable barriers that are pressure sensitive such that the barriers will not operate when an object, such as a passenger or mobility aid, are present on the barrier.

SUMMARY OF THE INVENTION

A wheelchair lift formed in accordance with one embodiment of the present invention includes a barrier moveable between an access position and a blocking position and an actuator. The actuator is coupled to the barrier and the actuator is adapted to apply an actuation force upon the barrier to move the barrier from the access position to the blocking position. When the barrier is in an unloaded state, the actuation force causes the actuator to move in a first direction resulting in the barrier moving from the access position to the blocking position. When the barrier is in a loaded state, the actuation force causes the actuator to move in a second direction a predetermined amount without causing substantial movement of the barrier.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
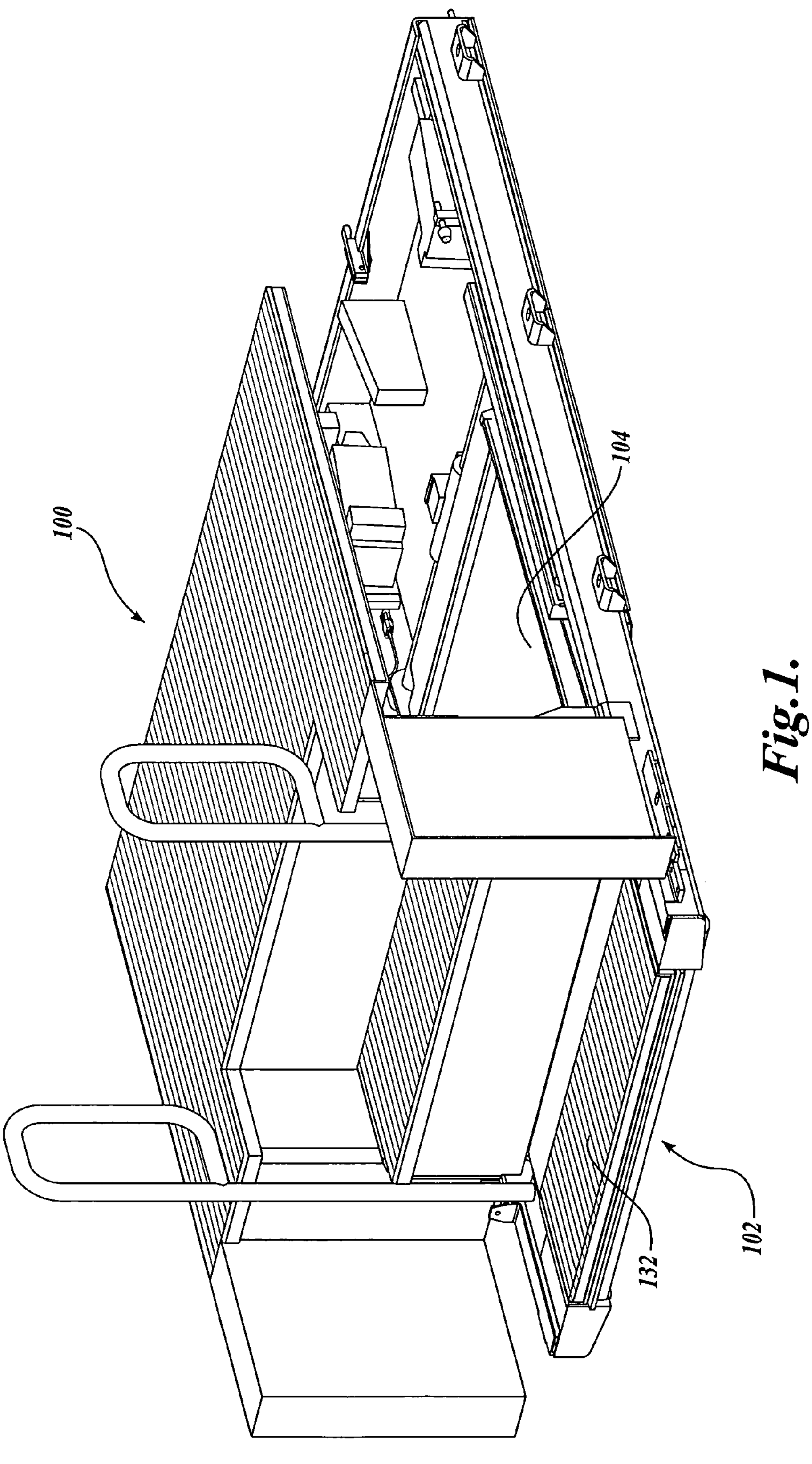
FIG. 1 is an isometric view of a wheelchair lift assembly device formed in accordance with the present invention shown in a stowed position.
Figure 2:
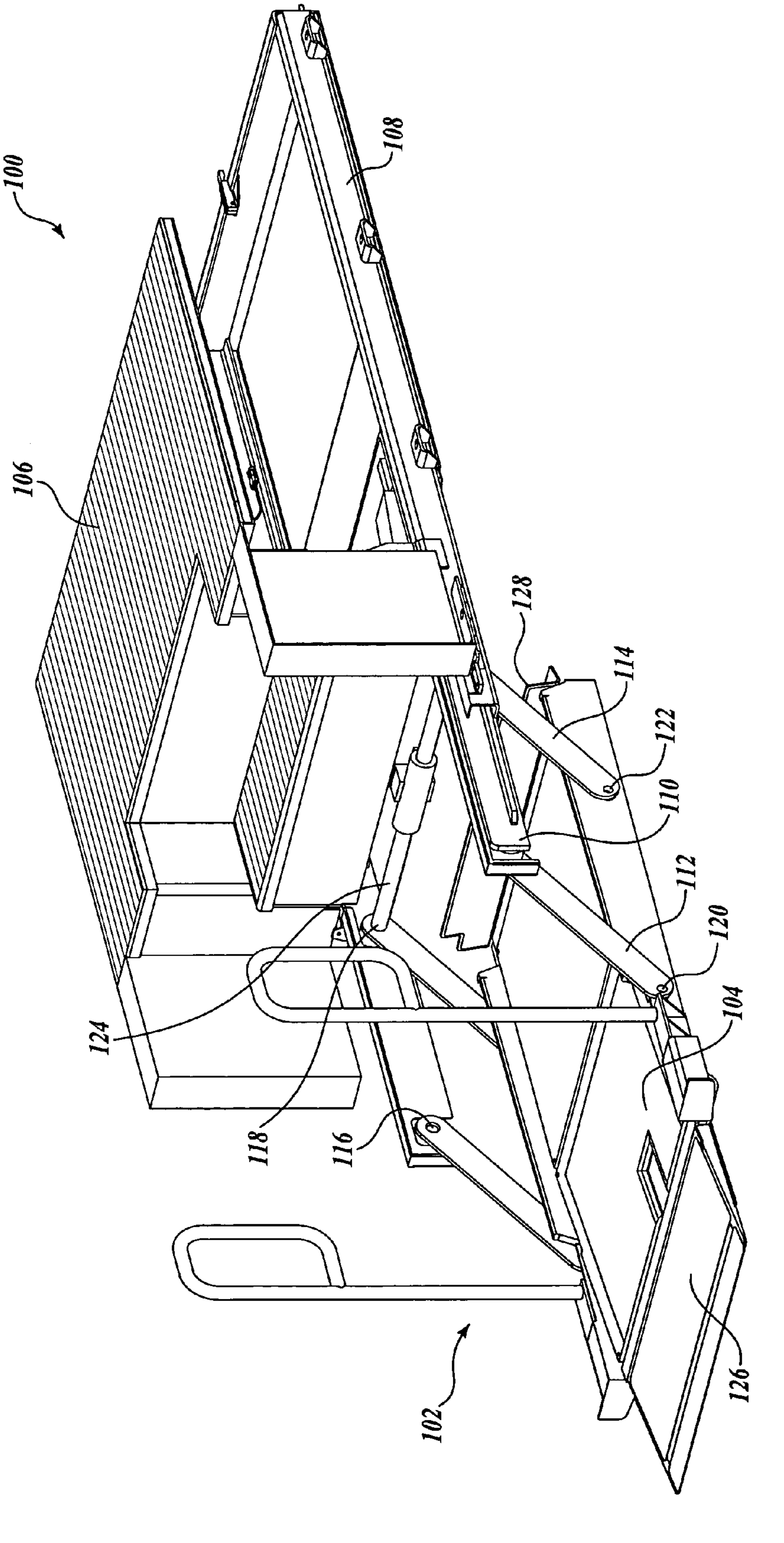
FIG. 2 is an isometric view of the wheelchair lift assembly of FIG. 1 shown deployed to a ground level loading and/or unloading position.

A wheelchair lift assembly 100 formed in accordance with one embodiment of the present invention is shown in FIGS. 1-11. Referring to FIG. 2, generally described, the wheelchair lift assembly 100 provides access for mobility impaired individuals (not shown) to a vehicle (not shown). The wheelchair lift assembly 100 includes a lift assembly 102. The lift assembly 102 includes a lift platform 104 that may be actuated into a lowered loading position as shown in FIG. 2, thereby permitting a mobility impaired individual to access the lift platform 104 from a curbside position.

Figure 3:
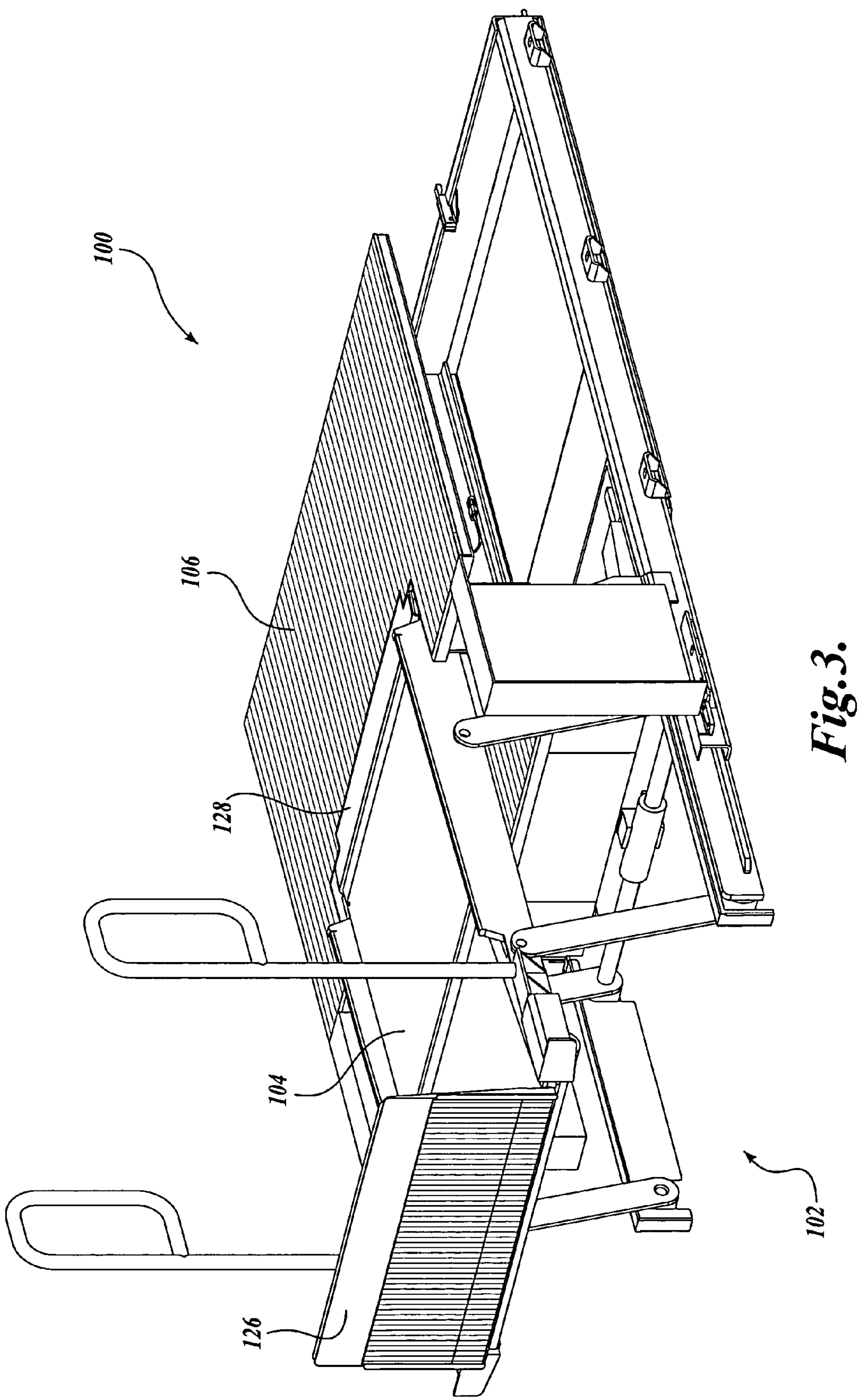
FIG. 3 is an isometric view of the wheelchair lift assembly of FIG. 1 shown deployed to a vehicle floor level loading and/or unloading position.

The wheelchair lift assembly 100 also includes an inboard barrier 128. The inboard barrier 128 may be reciprocated between a bridge position (FIG. 3) to a blocking position as shown in FIG. 2. In the blocking position, the inboard barrier 128 impedes a person located on the lift platform from rolling off of the inboard edge of the lift platform 104. Once the user is on the lift platform 104, the lift platform 104 may then be raised to an unloading position as shown in FIG. 3, wherein the user may roll onto an interior floor 106 of the vehicle after actuation of the inboard barrier 128 to the bridge position.

When disembarking, the procedure is reversed. The lift platform 104 is raised to the previous unloading position as illustrated in FIG. 3, which is now a loading position, wherein the inboard barrier 128 has actuated to a bridge position. The inboard barrier 128 is configured such that if a mobility impaired user is resting on the inboard barrier 128 when the inboard barrier 128 is in the bridge position, the inboard barrier 128 will not actuate from the bridge position into the blocking position, potentially causing user injury. The wheelchair bound individual, once positioned on the lift platform 104, is then lowered to the previous lowered loading position as shown in FIG. 2, which is now an unloading position, permitting the wheelchair bound individual to roll off the lift platform 104 and onto the sidewalk or other surface. In light of the above general description of the wheelchair lift assembly 100, the structural components forming the wheelchair lift assembly 100 will now be discussed in greater detail.

Lift Assembly Description

Referring to FIG. 2, the lift assembly 102 is substantially similar to the platform-type wheelchair lift disclosed in U.S. Pat. No. 6,095,747, the disclosure of which is hereby expressly incorporated by reference. The lift assembly 102 includes a generally rectangular stationary frame 108 that is mounted to the underside of a vehicle, such as a bus or train. A reciprocating frame 110 is slidably mounted relative to the stationary frame 108 so that the reciprocating frame 110 may move between a retracted position (FIG. 1) where the reciprocating frame 110 is retracted underneath the floor of the vehicle, to an extended position (FIG. 2), where the reciprocating frame 110 extends outward from the vehicle. The lift platform 104 is mounted to the reciprocating frame 110 by outer platform arms 112 and inner platform arms 114. The outer and inner platform arms 112 and 114 may be rotated to move the lift platform 104 from a lowered position as shown in FIG. 2 to a raised position as shown in FIG. 3.

When the reciprocating frame 110 is fully extended and the lift platform 104 is in the lowered position as shown in FIG. 2, a person may maneuver a wheelchair onto or off of the lift platform 104 and off or onto a support surface, such as a sidewalk, roadway, etc. The lift platform 104 is then moved to its raised position (FIG. 3), at which time the wheelchair may be maneuvered off or onto the lift platform 104 and into or out of the interior of the bus or other vehicle, as described in more detail below.

The reciprocating frame 110 is moved between the extended and retracted positions by a reciprocating frame actuator (not shown), one suitable example being a belt drive mechanism as disclosed in U.S. Pat. No. 6,095,747. Although a belt drive mechanism is described for actuating the reciprocating frame 110 between the extended and retracted position, it should be apparent to those skilled in the art that any suitable means of actuation are suitable for use with the present embodiments. As non-limiting examples, gear, magnetic, rack and pinion, or hydraulic actuators, chain drive mechanisms, servos, solenoids, linear motors, etc. are all within the scope of the present disclosure.

Still referring to FIG. 2, the lift platform 104 is raised and lowered by outer and inner arms 112 and 114. The outer and inner arms 112 and 114 couple the lift platform 104 to the reciprocating frame 110 thereby forming a parallelogram linkage between the reciprocating frame 110 and the lift platform 104. The parallelogram linkage keeps the reciprocating frame 110 and lift platform 104 parallel throughout the movement of the lift platform from a lowered position to a raised position and vice versa. One end of each of the arms 112 and 114 is pivotally attached to the reciprocating frame 110 at pivots 116 and 118, respectively. The other end of each arm 112 and 114 is pivotally attached to the lift platform 104 at pivots 120 and 122, respectively.

A pair of hydraulic lift platform actuators (not shown) may be coupled to actuation arms (not shown) extending radially outward from each of the inner arms 114 at pivots 118. As the lift platform actuators are extended or retracted outward or inward with respect to the reciprocating frame 110, the outer and inner arms 112 and 114 pivot about pivots 116, 118, 120, and 122, thus selectively lowering or raising the platform 104.

The inner arms 114 are also joined together at the pivot points 118 by a torque tube 124 that is welded or otherwise fastened to the inner surfaces of the inner arms 114. The torque tube 124 ensures that the inner arms 114 move in unison and thus maintain the same orientation with respect to each other. The torque tube 124 allows the two lift platform actuators to work together and also ensures that if there is a malfunction in the lift assembly 102 the lift platform 104 is maintained at substantially the same elevation on both sides and does not cant or lean, possibly causing harm to the wheelchair occupant.

The lift platform 104 includes a rotatable outboard barrier 126 and a rotatable inboard barrier 128. The outboard and inboard barriers 126 and 128 help to ensure that a wheelchair and wheelchair occupant remain on the lift platform 104 during operation of the wheelchair lift assembly 102. The outboard and inboard barriers 126 and 128 are rotatably attached to the outboard edge of the lift platform 104 and the inboard edge of the lift platform 104 respectively.

Figure 4:
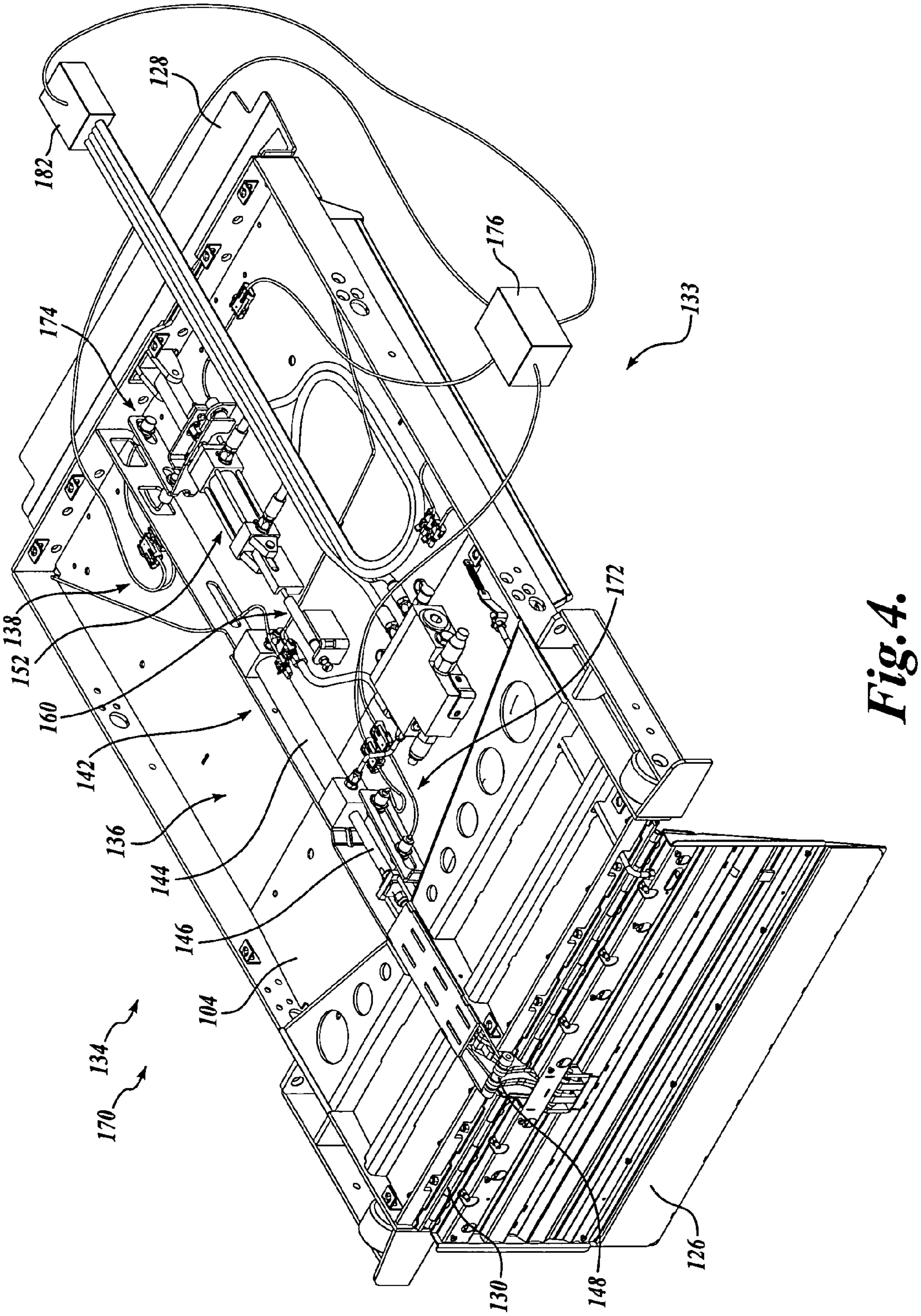
FIG. 4 is a bottom isometric view of a lift platform of the wheelchair lift assembly of FIG. 1.

Turning to FIG. 4 and focusing on the outboard barrier 126, the inboard edge of the outboard barrier 126 is rotatably attached to the outboard edge of the lift platform 104 over its length by a hinge 130. The outboard barrier rotates about the hinge 130 such that it is movable from between a stowed position as shown in FIG. 1 to a fully extended, access, or ramp position shown in FIG. 2. In the stowed position (See FIG. 1), the outboard barrier 126 is in an overlapping relationship with the lift platform 104 such that a lower surface of the outboard barrier 126 forms the bottom stair step 132 while the upper surface of the outboard barrier 126 lies adjacent the upper surface of the lift platform 104.

In the ramp position (See FIG. 2), the outboard barrier 126 extends in approximately the same plane as the lift platform 104. An upper surface of the outboard barrier 126 slants upward to form a ramp that assists in accessing the lift platform 104. The outboard barrier 126 is also positionable in a blocking position (See FIG. 3), in which the outboard barrier 126 is oriented substantially vertical so as to block egress of a wheelchair from the lift platform 104, thereby resisting and/or preventing a wheelchair from moving off of the front of the lift platform 104 during use.

The actuation of the outboard and inboard barriers 126 and 128 is controlled by a control assembly 133. The control assembly 133 includes a control unit 176, an actuation assembly 134, and a sensor assembly 170. The actuation assembly 134 includes a hydraulic assembly 182, an outboard barrier actuator assembly 136, and an inboard barrier actuator assembly 138. The sensor assembly 170 includes an outboard barrier sensor assembly 172 and an inboard barrier sensor assembly 174.

Figure 6:
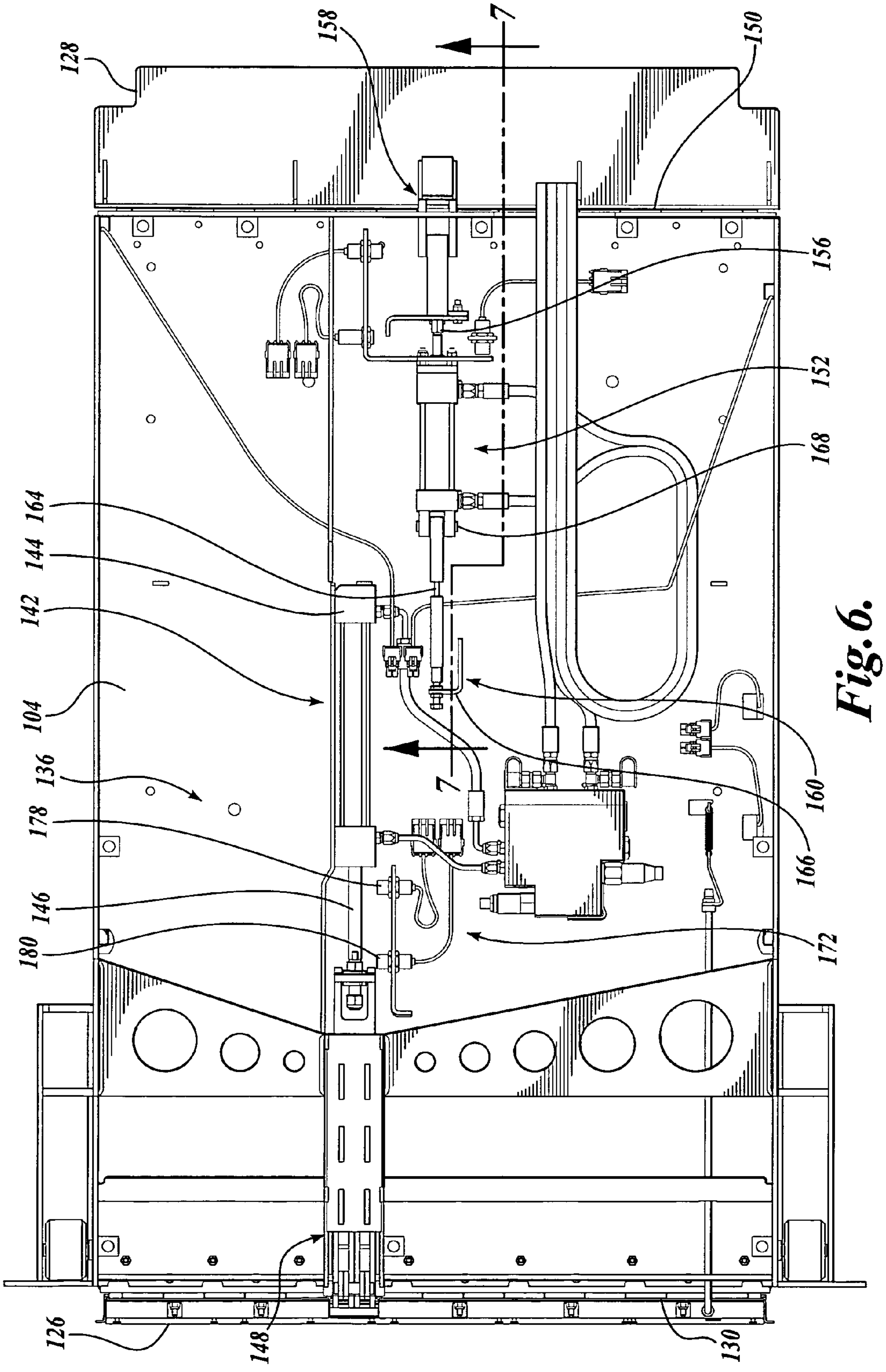
FIG. 6 is a bottom plan view of the lift platform of the wheelchair lift assembly of FIG. 1 showing an inboard barrier in a bridge position and the inboard barrier actuation assembly prior to actuation of an inboard barrier actuator.

Turning to FIG. 6 and focusing on the outboard barrier actuator assembly 136, the outboard barrier actuator assembly 136 includes an actuator 142 rigidly coupled to the lift platform 104. The actuator 142 includes an actuator body 144 and a driven member 146, which in the illustrated embodiment is a shaft. A hydraulic fluid may be selectively directed within the actuator body 144 to cause the selected retracting and extending of the driven member 146 from the actuator body 144.

Figure 10:
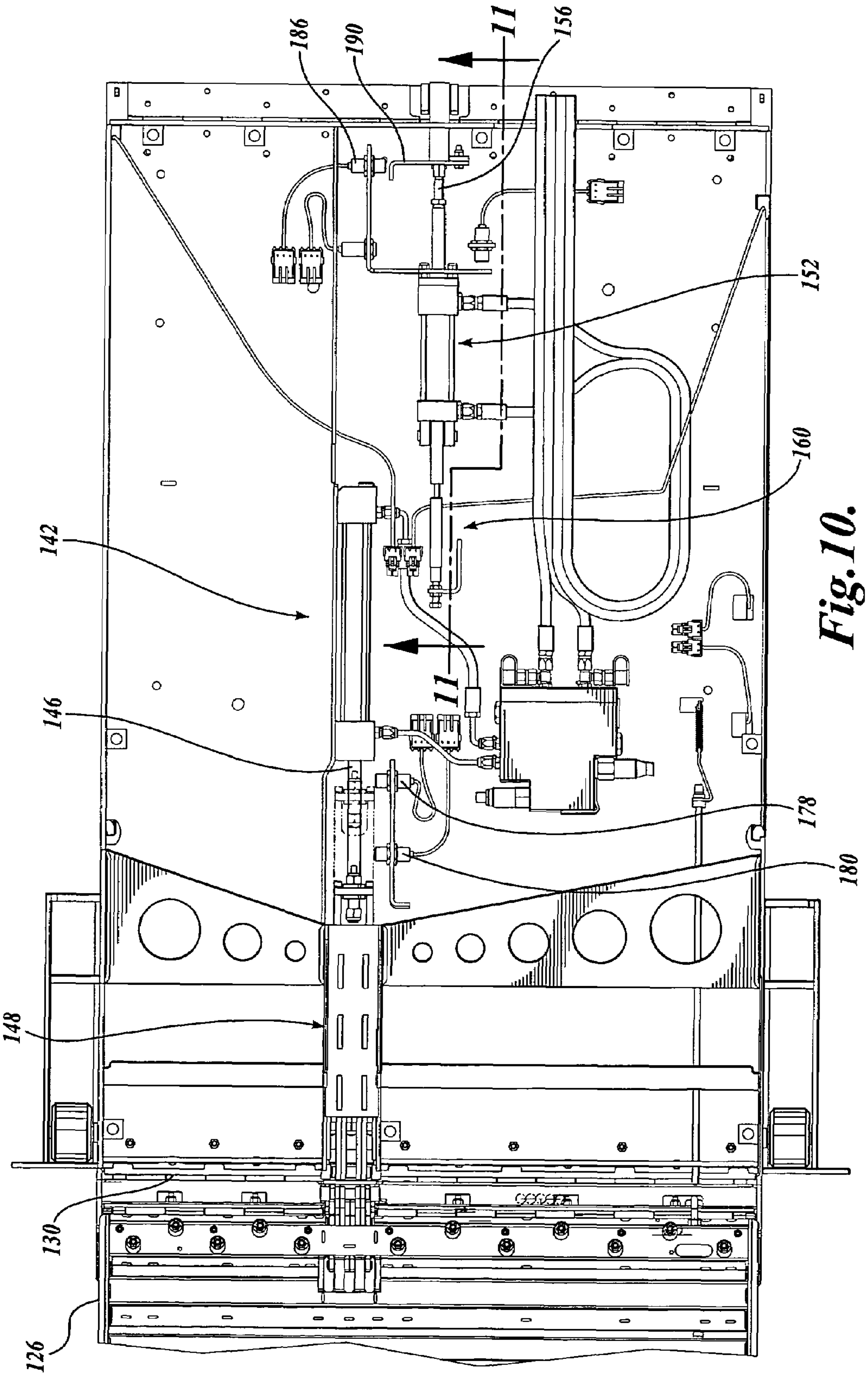
FIG. 10 is a bottom plan view of the lift platform of the wheelchair lift assembly of FIG. 1 showing the outboard barrier in a ramp position, the inboard barrier in the blocking position, and the inboard barrier actuation assembly after actuation of the inboard barrier actuator.

The driven member 146 is coupled to the outboard barrier 126 via a hinge mechanism 148. One suitable hinge mechanism is described in U.S. Pat. Nos. 5,284,414 and RE 36,805, both issued to Kempf, the disclosures of which are hereby expressly incorporated by reference. Referring to FIG. 10, extension of the driven member 146 by the actuator 142 results in the hinge mechanism 148 driving the outboard barrier 126 about hinge 130 from the blocking position as shown in FIG. 6 to the ramp position shown in FIG. 10. Likewise, retraction of the driven member 146 to its phantom position shown in FIG. 10 by the actuator 142 from the position shown in FIG. 6 results in the hinge mechanism 148 driving the outboard barrier 126 about hinge 130 from the blocking position shown in FIG. 6 to the stowed position shown in FIG. 1.

Referring to FIGS. 4 and 6, the outboard sensor assembly 172 includes a step or stowed position sensor 178 and a blocking position sensor 180 spaced from one another. The sensors 178 and 180 are suitably proximity sensors and detect the presence or absence of a distal end of the driven member 146 of the actuator 142 to aid in determining the position of the driven member 146. For instance, as shown in FIG. 6, the distal end of the driven member 146 is before the blocking position sensor 180. Thus, the blocking position sensor 180 sends a signal to the control unit 176 indicating the presence of the distal end of the driven member 146 before the blocking position sensor 180, thus indicating to the control unit 176 that the outboard barrier 126 is in the blocking position. To place the outboard barrier 126 in the ramp position as shown in FIG. 2, the distal end of the driven member 146 is extended further outward from its position shown in FIG. 6 adjacent the blocking position sensor 180 to the position shown in FIG. 10.

To place the outboard barrier 126 in the stowed position, the driven member 146 is retracted to its phantom position shown in FIG. 10 so that the distal end of the driven member 146 is before the stowed position sensor 178. Thus, the stowed position sensor 178 sends a signal to the control unit 176 (See FIG. 4) indicating the presence of the distal end of the driven member 146 before the stowed position sensor 178, thereby indicating to the control unit 176 that the outboard barrier 126 is in the stowed position.

Referring to FIGS. 4 and 6, the control unit 176 is in signal communication with a hydraulic assembly 182. The hydraulic assembly 182 selectively pumps and receives hydraulic fluid from the actuator 142 to selectively actuate the actuator 142 to selectively extend or retract the driven member 146 from the actuator body 144 through well known valving and pump(s). The control unit 176, upon sensing that the outboard barrier 126 is at the blocking position, actuates the hydraulic assembly 182 to cease flow of hydraulic fluid to and from the actuator 142, thereby preventing further movement of the outboard barrier 126.

Turning to FIG. 6 and as mentioned above, the lift platform 104 also includes a movable inboard barrier 128. The inboard barrier 128 is rotatably mounted to the inboard edge of the lift platform 104 using a hinge 150. The inboard barrier 128 is movable between a fully extended, access, or bridge position shown in FIG. 3 to an upright blocking position shown in FIG. 2. In its blocking position, the inboard barrier 128 prevents a wheelchair from moving off the inboard edge of the lift platform 104. In the bridge position, the inboard barrier 128 is configured so that the upper surface of the inboard barrier 128 forms an extension of the upper surface of the lift platform 104 as shown in FIG. 3. More specifically, referring to FIG. 3, in the bridge position, the inboard barrier 128 spans the gap between the lift platform 104 and the vehicle floor 106 of the bus on which the device 100 is mounted so that a wheelchair may exit the wheelchair lift and enter the interior of the bus or other vehicle.

Figure 5:
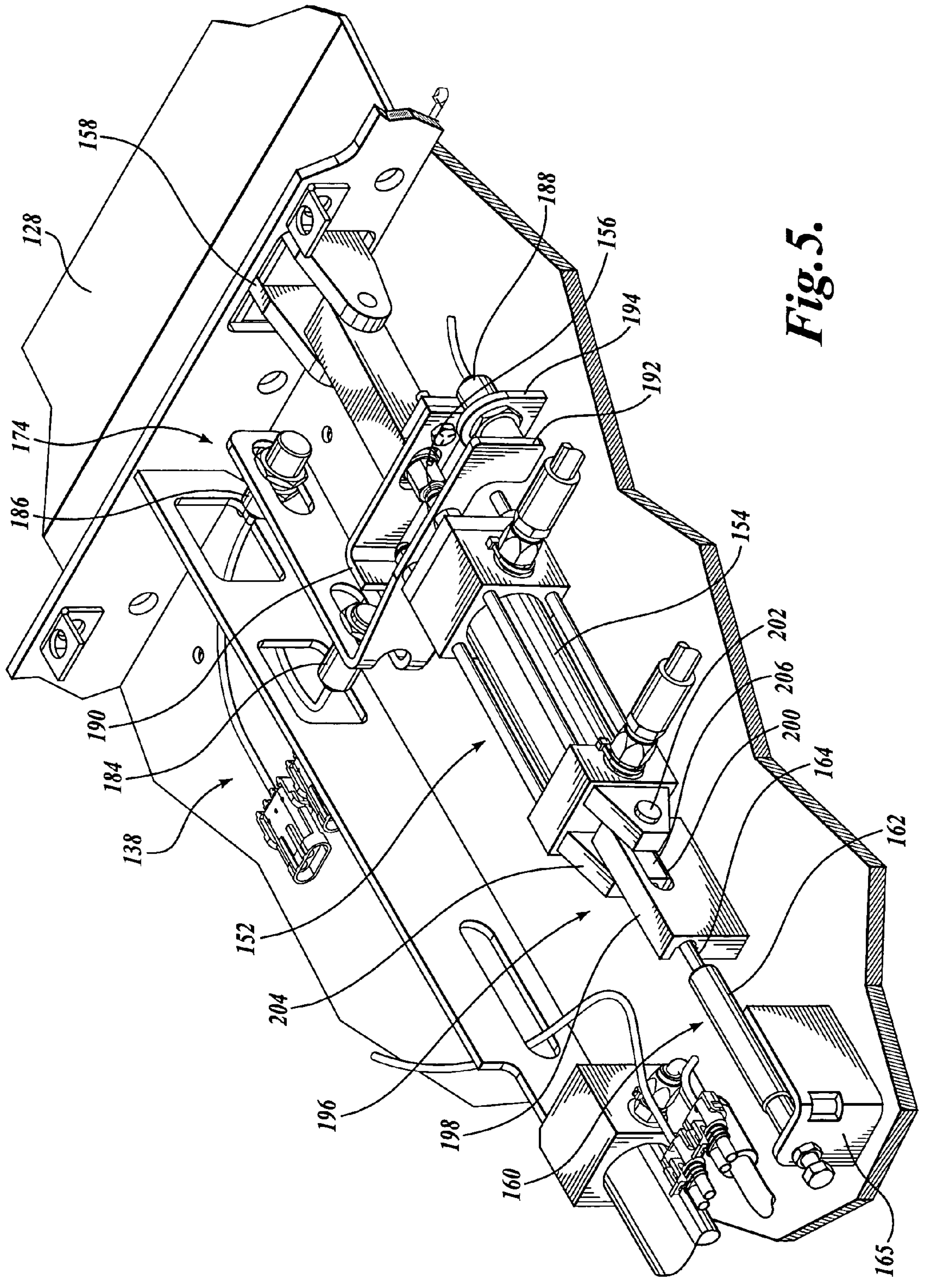
FIG. 5 is a partial isometric view of an inboard barrier actuation assembly of FIG. 4.

Referring to FIGS. 4 and 5, the inboard barrier 128 is actuated between the fully upright position and the bridge position by the inboard barrier actuator assembly 138. The inboard barrier actuator assembly 138 includes an actuator 152 moveably coupled to the lift platform 104. The actuator 152 includes an actuator body 154 and a driven member 156, which in the illustrated embodiment is a shaft. A hydraulic fluid may be selectively directed within the actuator body 154 to cause the selected retracting and extending of the driven member 156.

The driven member 156 is coupled to the inboard barrier 128 via a hinge mechanism 158. The actuator body 154 is coupled to a biasing device 160. The biasing device 160 may be any device adapted to apply a biasing force, a few suitable examples being a stopper of an elastic material, such as rubber, a mechanical spring, a gas spring, such as an extension gas spring, or a compression gas spring as shown. The biasing device 160 includes a body portion 162 and a biased member 164. The body portion 162 is anchored to the lift platform 104 by a mounting bracket 165. When a force is applied to the biased member 164 by the actuator 152, the body portion 162 is adapted to apply an equal and opposite force upon the biased member 164. The biased member 164 moves a selected amount depending upon the magnitude of force applied to the driven member. The amount of movement is determined by the spring constant of the biasing device 160 as is well known in the art. By selecting a biasing device 160 having a selected spring constant, one can determine the amount of force deliverable by the biasing device 160 when the biased member 164 is moved a predetermined amount.

The spring constant of the biasing device is preferably selected such that the amount of contraction (or extension) of the biasing device 160 when the inboard barrier 128 is driven by the actuation force from the bridge position to the blocking position when the inboard barrier 128 is in an unloaded state is unsubstantial such that the inboard sensor assembly 174 does not register the biased member 164 as having moved. Further, the spring constant is selected such that the contraction (or extension) of the biasing device 160 when the actuation force is applied to the barrier and the barrier is in the loaded condition is substantial such that the inboard sensor assembly 174 is able to recognize that the biased member 164 has moved and terminate further actuation of the actuator 152 as will be described in more detail below.

Focusing on the inboard sensor assembly 174, the inboard sensor assembly includes an access or bridge position sensor 184, a blocking position sensor 186, and an actuator movement sensor 188. The sensors 184, 186, and 188 are proximity sensors and as such are able to determine the presence or absence of an object to aid in determining the current position of inboard barrier 128 and/or the actuator body 154. For instance, with reference to the access position sensor 184 and the blocking position sensor 186, each of the sensors 184 and 186 is able to determine when a sensor plate 190 coupled to the driven member 156 of the actuator 152 is in proximity to the sensor 184 or 186. More specifically, when the inboard barrier 128 is in the bridge position, the sensor plate 190 is adjacent the access position sensor 184. The access position sensor 184, upon detecting the presence of the sensor plate 190, is able to send a signal to the control unit 176 indicating that the inboard barrier 128 is in the bridge or access position. Likewise, if the inboard barrier 128 has been actuated to the blocking position, than the sensor plate 190 is adjacent the blocking position sensor 186 as shown in FIG. 10. The blocking position sensor 186, upon detecting the presence of the sensor plate 190, is able to send a signal to the control unit 176 indicating that the inboard barrier 128 is in the blocking position.

The actuator movement sensor 188 is used to detect movement of the actuator body 154. Moreover, the actuator movement sensor 188 is disposed adjacent a sensor plate 192 coupled to the actuator body 154. The actuator movement sensor 188 is coupled to the lift platform 104 by a mounting bracket 194. Thus, when the actuator body 154 moves, the distance between the sensor plate 192 and the actuator movement sensor 188 changes. Upon sensing a change in the distance between the actuator movement sensor 188 and the sensor plate 192 of a selected amount, such as the amount of change depicted from comparison of FIGS. 6 and 7 relative to FIGS. 8 and 9, the actuator movement sensor 188 sends a signal to the control unit 176 indicating that the actuator body 154 has moved.

The control unit 176 is in communication with the hydraulic assembly 182. The hydraulic assembly 182 selectively pumps and receives hydraulic fluid from the actuator 152 to selectively actuate the actuator 152. The control unit 176, upon sensing that the actuator body 154 has moved, actuates the hydraulic assembly 182 to cease flow of hydraulic fluid to and from the actuator 152, thereby impeding movement of the inboard barrier 128 and potentially preventing injury to a user resting on the inboard barrier.

Turning to FIG. 5, to guide the outboard end of the actuator 152 as the actuator body 154 moves toward the biasing device 160, a guide assembly 196 is used. The guide assembly 196 includes a guide block 198 coupled to the lift platform 104. The guide block 198 includes a guide slot 200. A pin 202 coupled to a clevis 204 of the actuator 152 slidingly rides along a predetermined path defined by the guide slot 200 and pivots within the slot 200 during movement of the actuator body 154 as the biasing device 160 contracts and extends. An adapter 206 couples the distal end of the biased member 164 of the biasing device 160 to the pin 202 and guides the pin 202 within the slot 200 as the actuator moves during retraction and extension of the biased member 164. The interaction of the clevis 204, slot 200, and adapter 206 during actuator movement aids in restricting the movement of the actuator body 154 and biased member 164 of the biasing device 160 along preselected paths.

Operation Description

Referring to FIGS. 2 and 4, the general operation of the device 100 will now be described. During standard operation of the bus or other vehicle on which the wheelchair lift assembly 100 is mounted, the lift platform 104 is maintained in its stowed position (FIG. 1) underneath the bus. When the vehicle stops in order to load a wheelchair onto the vehicle, the lift platform 104 moves as follows. First, the reciprocating frame 110 is moved to its fully extended position, which is accomplished by the control unit 176 sending a control signal to an actuator (not shown) to move the reciprocating frame 110 outward. Once extended, the outboard and inboard barriers 126 and 128 are moved to the upright blocking positions by the actuation assembly 134. The lift platform 104 is then lowered into contact with the ground by rotation of arms 112 and 114. Once the lift platform 104 contacts the ground, the control unit 176 stops the downward movement of the lift platform 104. The outboard barrier 126 is then moved to its ramp position as illustrated in FIG. 2. This is accomplished by the control unit 176 sending a control signal to the actuator 142 of the outboard barrier actuator assembly 136 to extend in length.

Once the wheelchair lift is fully deployed to ground level, a wheelchair occupant moves his or her wheelchair up the ramp formed by the outboard barrier 126 onto the lift platform 104. After the wheelchair is on the lift platform 104, the outboard barrier 126 moves to its blocking position as shown in FIG. 3. The actuation of the outboard barrier 126 is accomplished by the control unit 176 sending a control signal to the actuator 142 of the outboard barrier actuator assembly 136 to contract in length. The lift platform 104 is then raised to its fully raised position shown in FIG. 3 by the arms 112 and 114 being rotated by the actuation assembly 134 under control of the control unit 176. Once the upper surface of the lift platform 104 is substantially coplanar with the floor 106 of the vehicle, the inboard barrier 128 moves to its bridge position such that the inboard barrier 128 bridges the gap between the lift platform 104 and the floor 106 of the vehicle. This is accomplished by the control unit 176 sending a control signal to the actuator 152 of the inboard barrier actuator assembly 138 instructing the actuator 152 to retract in length. The wheelchair occupant may then move the wheelchair into the interior of the bus or other vehicle over the inboard barrier 128. In order for a wheelchair to be lowered from the interior of the bus to the sidewalk, the wheelchair lift operates in reverse order. After loading or unloading a wheelchair, the lift platform 104, barriers 126 and 128, and reciprocating frame 110, move to their stowed positions, as illustrated in FIG. 1.

Figure 7:
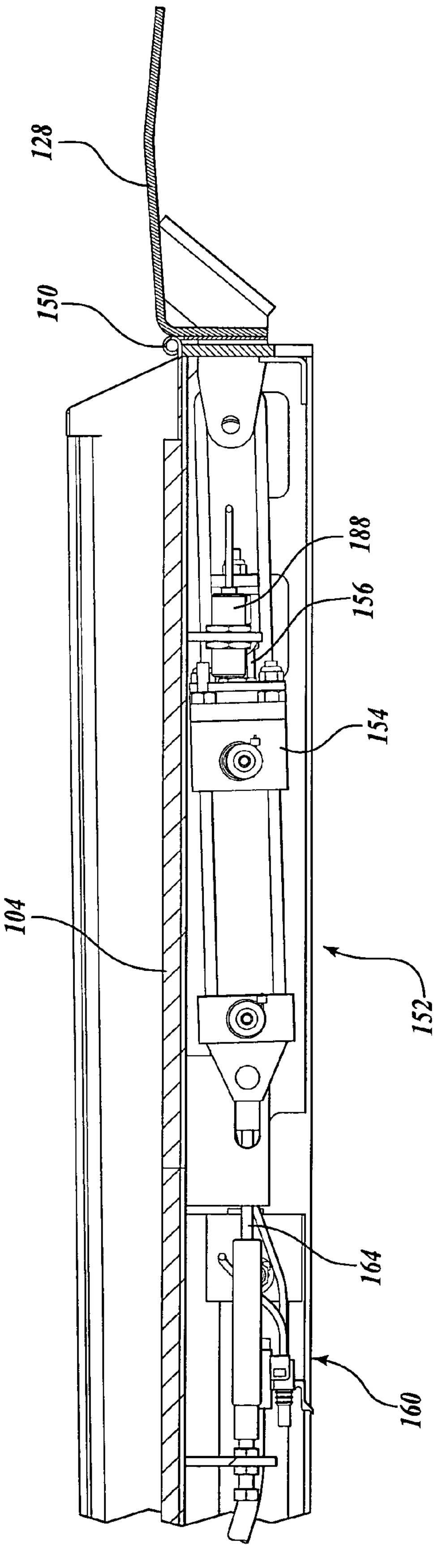
FIG. 7 is a cross sectional side view of the inboard barrier actuation assembly taken substantially through Section 7-7 of FIG. 6 and inverted from top to bottom for reasons of clarity to show the lift platform in its normal orientation during use, i.e. with a surface of the lift platform which supports the wheelchair bound user facing upward.

The inboard barrier 128 is configured to be actuated into its blocking position only if the inboard barrier 128 is in the unloaded state. This is accomplished through the interaction of the biasing device 160 with the inboard barrier 128 as will be described in more detail herein. Referring to FIGS. 6 and 7, extension of the driven member 156 by the actuator 152 results in either: 1) movement of the driven member 156 relative to the lift platform 104 such that the inboard barrier 128 is rotated about hinge 150 from the bridge position to the blocking position, or 2) movement of the actuator body 154 relative to the lift platform 104 and contraction of the biasing device 160. Movement of the actuator body 154 towards the biasing device 160 triggers the actuator movement sensor 188 to send a signal to the control unit 176 (See FIG. 4) to cease actuation of the actuator 152, thereby preventing movement of the inboard barrier 128 from the bridge or access position.

Figure 8:
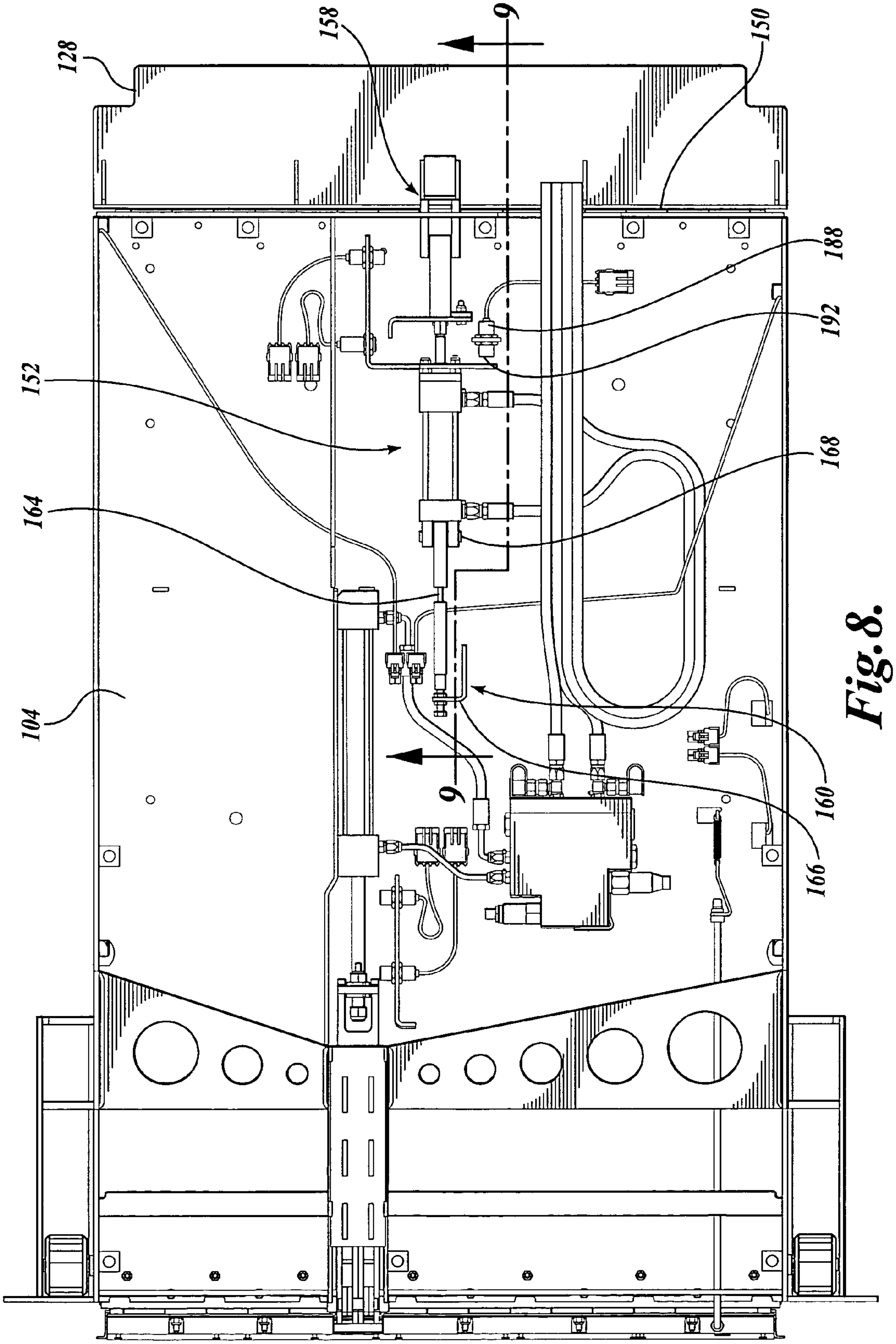
FIG. 8 is a bottom plan view of the lift platform of the wheelchair lift assembly of FIG. 1 showing an inboard barrier in a bridge position and in its passenger loaded state after the inboard barrier actuation assembly has been actuated in an attempt to move the inboard barrier from the bridge position to a blocking position.
Figure 9:
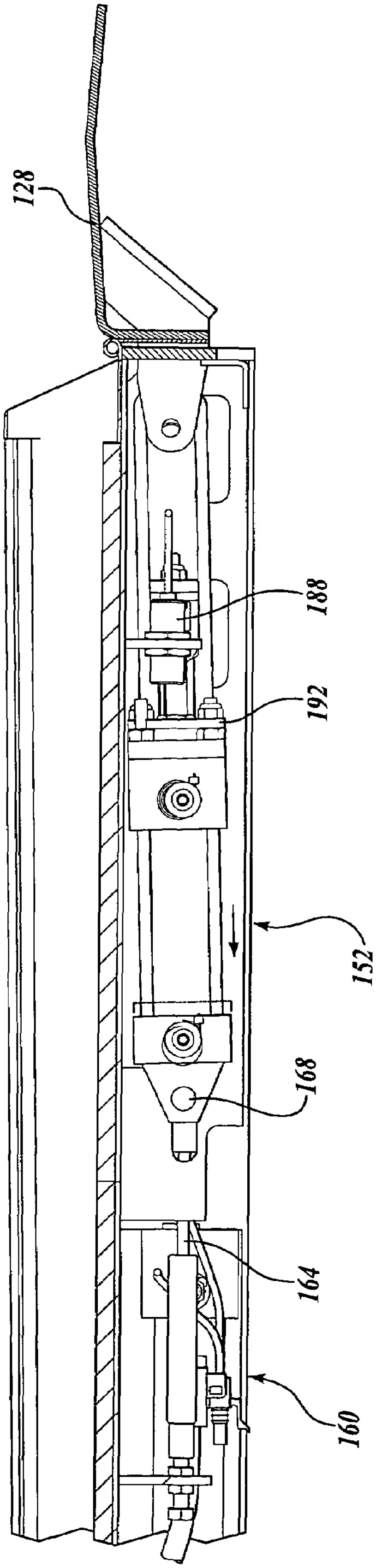
FIG. 9 is a cross sectional side view of the inboard barrier actuation assembly of FIG. 8 taken substantially through Section 9-9 of FIG. 8 and inverted from top to bottom for reasons of clarity to show the lift platform in its normal orientation during use, i.e. with the surface of the lift platform which supports the wheelchair bound user facing upward.

The determining factor of whether the inboard barrier 128 is moved into the blocking position when the driven member 156 of the actuator is extended is whether the inboard barrier 128 is in a loaded state or an unloaded state. Referring to FIGS. 8 and 9, if the inboard barrier 128 is in a loaded state, the biasing force applied by the biasing device 160 is overcome and the body portion 154 of the actuator 152 moves toward the biasing device 160 causing the biased member 164 of the biasing device 160 to retract as the driven member 156 of the actuator 152 extends.

The movement of the body portion 154 of the actuator 152 triggers the actuator movement sensor 188, causing the control unit 176 (See FIG. 4) to terminate the actuation of the actuator 152. Thus, the biasing device 160 absorbs the movement of the driven member 156 of the actuator 152 and the inboard barrier 128 remains in the bridge position.

Figure 11:
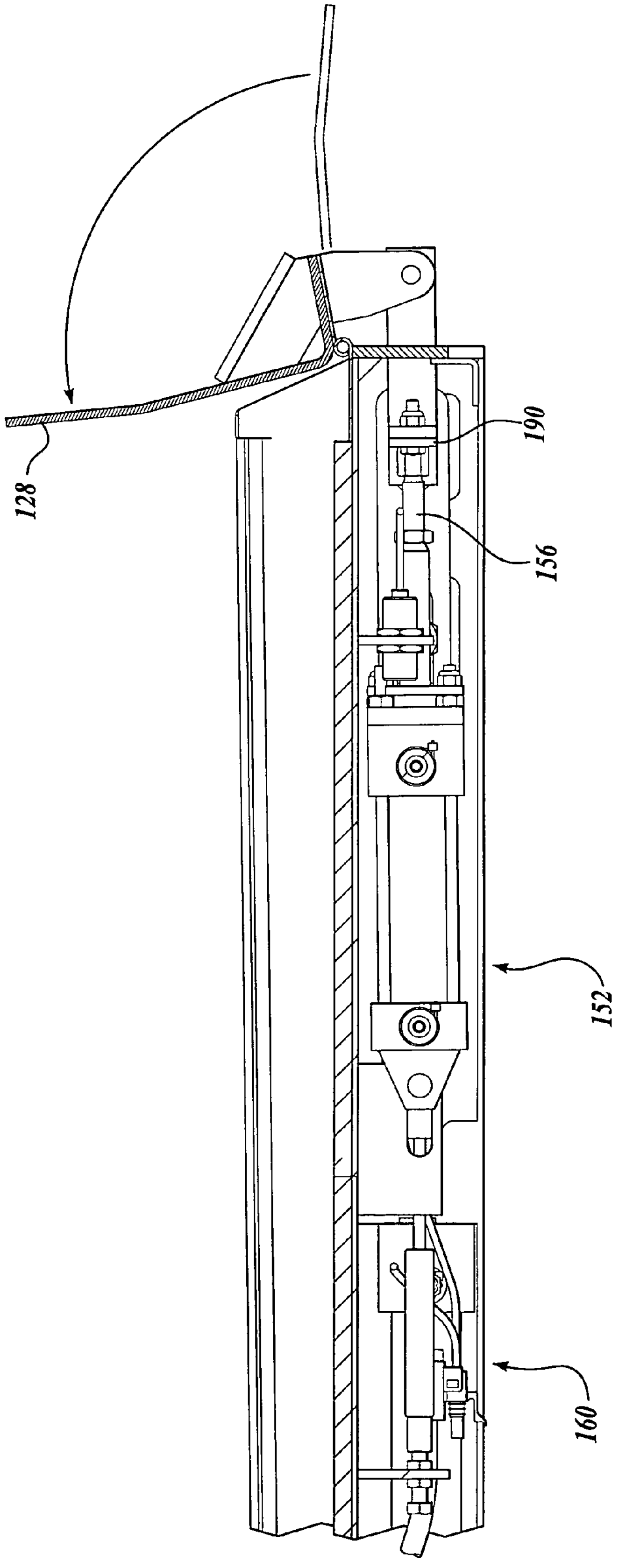
FIG. 11 is a cross sectional side view of the inboard barrier actuation assembly of FIG. 10 taken substantially through Section 11-11 of FIG. 10 and inverted from top to bottom for reasons of clarity to show the lift platform in its normal orientation during use, i.e. with the surface of the lift platform which supports the wheelchair bound user facing upward.

Referring to FIGS. 10 and 11, if the inboard barrier 128 is in the unloaded state, the biasing device 160 does not substantially contract from the actuation force applied by the actuator 152, and movement of the driven member 156 of the actuator 152 to the right results in the inboard barrier 128 transitioning from the bridge position to the blocking position.

For the purposes of this detailed description, a loaded state is when the inboard barrier 128 is supporting a weight of a predetermined magnitude, a few suitable examples being 5 lbs. or more, 10 lbs. or more, 20 lbs. or more, 30 lbs. or more, and 50 lbs. or more. The unloaded state is when the inboard barrier 128 is supporting a weight less than a weight of a predetermined magnitude, a few suitable examples being less than 5 lbs., less than 10 lbs., less than 20 lbs., less than 30 lbs., and less than 50 lbs. In a preferred embodiment, the predetermined magnitude is selected to represent the weight of a selected object, such as a person, a portion of a person, or a mobility aid, such that the inboard barrier 128 will not transition into the blocking position if the selected object is on the inboard barrier 128, thereby reducing the potential for injury to users and those in proximity to the wheelchair lift assembly 100.

Although the above embodiment is described and illustrated as having only the inboard barrier configured to resist movement when the inboard barrier is at least partially supporting an object, it should be apparent to those skilled in the art that the outboard barrier may also be so configured in the same manner as described above for the inboard barrier. Further, it should be apparent to those skilled in the art that any actuatable part of a wheelchair lift assembly may also be so configured to impede movement when the part encounters or at least partially supports an object.

Referring to FIG. 4, although the above embodiment is described and illustrated as terminating further actuation of the inboard barrier actuator 152 upon movement of the actuator body 154 only a slight, predetermined amount toward the biasing device 160, it should be apparent to those skilled in the art that the biasing device 160 may alternately be designed to contract to accommodate the entire range of motion of the actuator 152, thereby eliminating the need of the actuator movement sensor 188 to detect actuator body 154 movement and terminate further actuation of the actuator 152.

Further, although proximity sensors are illustrated and described in relation to the above embodiment, it should be apparent to those skilled in the art that any sensor able to detect the presence, absence, or movement of a component are suitable for use with and are within the spirit and scope of the present invention, a few suitable examples being motion sensors, mechanical switches, etc.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A wheelchair lift for a vehicle comprising:

(a) a barrier moveable between an access position and a blocking position;

(b) an actuator coupled to the barrier, the actuator adapted to apply an actuation force upon the barrier to move the barrier from the access position to the blocking position;

(c) wherein when the barrier is in an unloaded state, the actuation force causes the actuator to move in a first direction resulting in the barrier moving from the access position to the blocking position; and (d) wherein when the barrier is in a loaded state, the actuation force causes the actuator to move in a second direction a predetermined amount without causing substantial movement of the barrier.

2. The wheelchair lift of claim 1, further including a biasing device interfaced with the actuator, wherein when the actuator applies the actuation force and the barrier is in the loaded state, the biasing device changes in length to permit the actuator to move in the second direction the predetermined amount.

3. The wheelchair lift of claim 2, wherein the biasing device changes in length the predetermined amount when the actuation force exceeds a predetermined force, the predetermined force sufficient to cause the barrier to transition from the access position to the blocking position when the barrier is in the unloaded state but insufficient to cause the barrier to transition from the access position to the blocking position when the barrier is in the loaded state.

4. The wheelchair lift of claim 1, further including a control assembly coupled in signal communication with the actuator, the control assembly including a sensor for sensing movement of the actuator in the second direction, wherein upon sensing the predetermined amount of movement of the actuator in the second direction, the control assembly is adapted to control the actuator to cease application of the actuation force.

5. The wheelchair lift of claim 1, wherein the first direction is substantially opposite the second direction.

6. The wheelchair lift of claim 1, wherein the actuator includes a body portion and a driven member selectively extendable from the body portion, wherein the body portion is slideable along a predetermined path relative to the barrier.

7. A wheelchair lift for a vehicle comprising:

(a) a lift platform for supporting and lifting a user;

(b) a barrier moveably coupled to the lift platform, the barrier having a first position for permitting user ingress or egress from the lift platform and a blocking position for impeding user movement off or onto the lift platform;

(c) an actuator coupled to the barrier for applying an actuation force in a first direction upon the barrier for moving the barrier from the first position to the blocking position; and (d) a biasing device interfaced with the actuator, wherein the biasing device is adapted to permit the actuator to move in a second direction toward the biasing device a predetermined amount once the actuation force exceeds a predetermined value.

8. The wheelchair lift of claim 7, wherein the actuator includes a body portion coupled to the lift platform so as to be slideable along a predetermined path relative to the lift platform and a driven member coupled to the barrier, the driven member adapted to be selectively extended from the body portion to apply the actuation force upon the barrier.

9. The wheelchair lift of claim 8, wherein when the actuator applies the actuation force and the barrier is in an unloaded state, the driven member moves relative to the lift platform to transition the barrier from the first position to the blocking position, and when the barrier is in a loaded state, the driven member remains substantially stationary relative to the lift platform and the body portion moves relative to the lift platform.

10. The wheelchair lift of claim 7, wherein the actuator is coupled to the barrier at a first location and to the biasing device at a second location, wherein when the barrier is in a loaded state and the actuator applies the actuation force, the first location remains substantially stationary and the second location moves, and wherein when the barrier is in an unloaded state and the actuator applies the actuation force, the first location moves to cause the barrier to transition from the first position to the blocking position.

11. The wheelchair lift of claim 7, wherein the actuator is moveably disposed between the biasing device and the barrier such that application of the actuation force by the actuator causes the actuator to move either towards the biasing device or the barrier depending upon whether the biasing device or the barrier offers less resistance to actuator movement.

12. The wheelchair lift of claim 7, further including a control assembly having a sensor for sensing actuator movement, the control assembly coupled in signal communication with the actuator and adapted to control the actuator to cease application of the actuation force when the sensor senses that the actuator has moved the predetermined amount.

13. A wheelchair lift for a vehicle comprising:

(a) a lift platform for supporting and lifting a user;

(b) a barrier moveably coupled to the lift platform, the barrier having an unloaded state and a loaded state wherein the barrier supports a predetermined weight, the barrier moveable from a non-blocking position to a blocking position for impeding user access to or from the vehicle;

(c) an actuator coupled to the barrier, wherein the actuator is adapted to apply an actuation force upon the barrier to move the barrier from the non-blocking position to the blocking position; and (d) a biasing device interfaced with the actuator to apply a biasing force upon the actuator, wherein when the actuator applies the actuation force and the barrier is in the loaded state, the biasing force is overcome and the biasing device changes in length a predetermined amount to accommodate movement of the actuator.

14. The wheelchair lift of claim 13, wherein the actuator includes a body portion coupled to the lift platform to permit slideable movement of the body portion relative to the lift platform and a driven member coupled to the barrier, the driven member adapted to be selectively extended from the body portion to apply the actuation force upon the barrier.

15. The wheelchair lift of claim 14, wherein when the actuator applies the actuation force and the barrier is in the unloaded state, the driven member moves relative to the lift platform to transition the barrier from the non-blocking position to the blocking position, and when the barrier is in the loaded state, the driven member remains substantially stationary relative to the lift platform and the body portion moves relative to the lift platform.

16. The wheelchair lift of claim 13, wherein the actuator is coupled to the barrier at a first location and to the biasing device at a second location, wherein when the barrier is in the loaded state and the actuator applies the actuation force, the first location remains substantially stationary and the second location moves, and wherein when the barrier is in the unloaded state and the actuator applies the actuation force, the first location moves to cause the barrier to transition from the non-blocking position to the blocking position.

17. The wheelchair lift of claim 13, wherein the actuator is moveably disposed between the biasing device and the barrier such that application of the actuation force by the actuator causes the actuator to move either towards the biasing device or the barrier depending upon whether the biasing device or the barrier offers less resistance to actuator movement.

18. The wheelchair lift of claim 13, further including a control assembly having a sensor for sensing actuator movement, the control assembly coupled in signal communication with the actuator and adapted to control the actuator to cease application of the actuation force when the sensor senses that the actuator has moved the predetermined amount.

19. A wheelchair lift for a vehicle comprising:

(a) a barrier having a loaded state wherein the barrier supports a predetermined weight and an unloaded state wherein the barrier supports less than the predetermined weight;

(b) an actuator coupled to the barrier, wherein the actuator is actuatable to change in length to cause the barrier to move from a non-blocking position to a blocking position;

(c) a biasing device interfaced with the actuator; and (d) wherein a change in length of the actuator results in contraction of the biasing device a preselected amount without substantial movement of the barrier when the barrier is in the loaded state, and wherein the change in length of the actuator results in movement of the barrier from the non-blocking position to the blocking position without substantial contraction of the biasing device when the barrier is in the unloaded state.

20. The wheelchair lift of claim 19, wherein the actuator includes a body portion coupled to the lift platform by an attachment assembly permitting the body portion to move along a predetermined path relative to the lift platform and a driven member coupled to the barrier, the driven member adapted to be selectively extended from the body portion to apply the actuation force upon the barrier.

21. The wheelchair lift of claim 20, wherein when the actuator applies the actuation force and the barrier is in the unloaded state, the driven member moves to transition the barrier from the non-blocking position to the blocking position, and when the barrier is in the loaded state, the driven member remains substantially stationary and the body portion moves.

22. The wheelchair lift of claim 19, wherein the actuator is coupled to the barrier at a first location and to the biasing device at a second location, wherein when the barrier is in the loaded state and the actuator applies the actuation force, the first location remains substantially stationary and the second location moves, and wherein when the barrier is in the unloaded state and the actuator applies the actuation force, the first location moves to cause the barrier to transition from the non-blocking position to the blocking position.

23. The wheelchair lift of claim 19, wherein the actuator is moveably disposed between the biasing device and the barrier such that application of the actuation force by the actuator causes the actuator to move either towards the biasing device or the barrier depending upon whether the biasing device or the barrier offers less resistance to actuator movement.

24. The wheelchair lift of claim 19, further including a control assembly having a sensor for sensing actuator movement, the control assembly coupled in signal communication with the actuator and adapted to control the actuator to cease application of the actuation force when the sensor senses that the biasing device has contracted the preselected amount.

25. A wheelchair lift for a vehicle comprising:

(a) a barrier moveable between a first position and a second position, the barrier having a loaded state wherein the barrier at least partially supports an object and an unloaded state;

(b) an actuator coupled to the barrier at a first location;

(c) a biasing device interfaced with the actuator at a second location; and (d) wherein when the actuator is actuated to move the barrier from the first position to the second position and the barrier is in the loaded state, the second location moves and the first location remains substantially stationary such that the barrier remains in the first position; and (e) wherein when the actuator is actuated to move the barrier from the first position to the second position and the barrier is in the unloaded state, the first location moves and the second location remains substantially stationary such that the barrier transitions from the first position to the second position.

26. The wheelchair lift of claim 25, wherein the actuator includes a body portion that both rotates and translates relative to the lift platform and a driven member coupled to the barrier, the driven member adapted to be selectively extended from the body portion to apply the actuation force upon the barrier.

27. The wheelchair lift of claim 26, wherein when the actuator applies the actuation force and the barrier is in the unloaded state, the driven member moves to transition the barrier from the first position to the second position, and when the barrier is in the loaded state, the driven member remains substantially stationary and the body portion moves.

28. The wheelchair lift of claim 25, wherein the actuator is moveably disposed between the biasing device and the barrier such that application of the actuation force by the actuator causes the actuator to move either towards the biasing device or the barrier depending upon whether the biasing device or the barrier offers less resistance to actuator movement.

29. The wheelchair lift of claim 25, further including a control assembly having a sensor for sensing actuator movement, the control assembly coupled in signal communication with the actuator and adapted to control the actuator to cease application of the actuation force when the sensor senses actuator movement.

* * * * *